(12) United States Patent
Zimchoni (10) Patent No.: US 8,860,689 B2
(45) Date of Patent: Oct. 14, 2014

(54) METHOD AND SYSTEM FOR OPERATING A KEYBOARD WITH MULTI FUNCTIONAL KEYS, USING FINGERPRINTS RECOGNITION

(75) Inventor: Benjamin Zimchoni, Petah Tikva (IL)

(73) Assignees: Benjamin Zimchoni, Petah Tikva (IL); Teddy Nechmad, Herzlia (IL); Yoram Zer, Raanana (IL)

( * ) Notice: Subject to any disclaimer, the term of this patent is extended or adjusted under 35 U.S.C. 154(b) by 209 days.

(21) Appl. No.: 13/140,843

(22) PCT Filed: Dec. 20, 2009

(86) PCT No.: PCT/IL2009/001202
§ 371 (c)(1),
(2), (4) Date: Jun. 20, 2011

(87) PCT Pub. No.: WO2010/073243
PCT Pub. Date: Jul. 1, 2010

(65) Prior Publication Data
US 2011/0254771 A1    Oct. 20, 2011

(30) Foreign Application Priority Data
Dec. 23, 2008    (IL) .......................................... 196125

(51) Int. Cl.
*G06F 3/044* (2006.01)
*G06F 21/32* (2013.01)

(52) U.S. Cl.
CPC ...................................... *G06F 21/32* (2013.01)
USPC ........................... 345/174; 345/173; 382/124

(58) Field of Classification Search
None
See application file for complete search history.

(56) References Cited

U.S. PATENT DOCUMENTS

| 6,057,788 | A | 5/2000 | Cummings |
| 6,084,576 | A | 7/2000 | Leu |
| 8,253,696 | B2 * | 8/2012 | Antaki .......................... 345/173 |
| 2006/0020216 | A1 | 1/2006 | Oishi et al. |
| 2008/0042983 | A1 * | 2/2008 | Kim et al. ..................... 345/173 |
| 2008/0145127 | A1 | 6/2008 | Liu |
| 2008/0243624 | A1 | 10/2008 | Perry et al. |

* cited by examiner

*Primary Examiner* — Joseph Haley
(74) *Attorney, Agent, or Firm* — Browdy and Neimark, PLLC (57) ABSTRACT

An appliance with a keyboard, or a touch screen, equipped with sensors that can recognize each of the user's fingerprints. Several symbols are engraved on or below each key such that every time the key is pressed by a specific finger, it corresponds to a specific symbol from among the symbols associated with that key, such that the right-most finger activates the right-most symbol, the second from right finger activates the second from right symbol, and so on. The appliance can be switched to a work mode that displays additional series of symbols on the display panel of the appliance, such that every time the key is pressed by a specific finger, it corresponds to a specific symbol from among the symbols displayed on the corresponding display panel.

16 Claims, 7 Drawing Sheets

METHOD AND SYSTEM FOR OPERATING A KEYBOARD WITH MULTI FUNCTIONAL KEYS, USING FINGERPRINTS RECOGNITION

CROSS-REFERENCE TO RELATED APPLICATION

This application is a continuation-in-part of International Application No. PCT/IL2009/001202 filed Dec. 20, 2009, which claims priority based on Israeli Patent Application no. 196125, filed Dec. 23, 2008, both of which are incorporated herein by reference in their entirety.

TECHNICAL FIELD

The present invention refers to a method and system for operating keyboards or touch screens, with multi-functional keys on digital, electronic and other appliances whereby a specific function of the keys is activated by identifying the user's fingerprints and selecting the specific key function according to the finger pressing the key (the required action is selected one of several associated functions with the key that is pressed).

BACKGROUND ART

Digital, electronic and other appliances, such as computer keyboards, tabletop telephones, cellular phones, smart phones, hand-held computers, tablet PCs, hand-held terminals, control systems of digital, electronic or electric instrumentation such as operation panels in airplanes, weapon activation systems, testing equipment and so on, are all equipped with pushbuttons (keys), keyboards, or touch screens.

Figure 1:
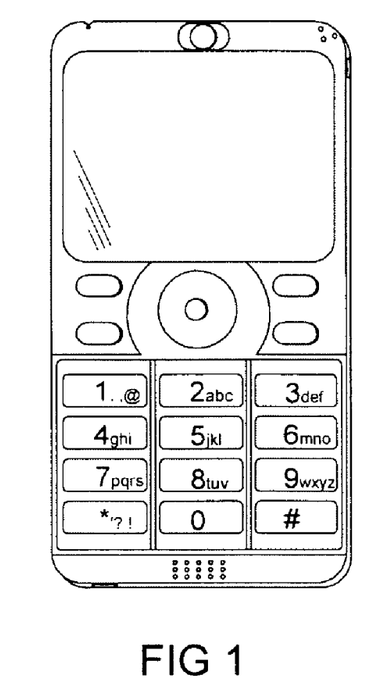
FIG. 1 schematically depicts a keyboard and display of a standard cellular phone.

The recent dramatic minimization of such systems and the physical constraints that sometimes exist, have led to a situation in which several different functions (i.e. the selection of a specific numeral or letter or symbol) are associated with a single key, since there are more functions than there are keys. One existing solution that enables a user to select a specific function associated with a specific key is the rapid, repeated pressing of the said key, whereby the desired function is selected by the number of times the user rapidly presses the key. For example, FIG. 1 depicts a schematic keyboard of a standard cellular phone that is in message writing mode. Pressing the "2" key once will select the letter "a"; pressing the "2" key twice in rapid succession will select the letter "b"; three consecutive presses will select the letter "c"; and the result of four consecutive presses will be the numeral "2". This solution is cumbersome and inconvenient and any error in pressing the key (which is a very common occurrence) leads to the need to repeat the entire sequence so as to reach the desired function. Nevertheless, the currently existing knowledge in the said field has several drawbacks: First, it is still necessary to press the key several times in order to select the desired function (for instance, when a group of characters was associated with a specific key/finger during the initialization process). Second, the system's initialization process (i.e. the enrollment of the fingerprints and their association with specific, pre-defined keys, or characters, or groups of characters) is very cumbersome and is not user-friendly. In addition, this method (of associating/pre-defining a specific finger to a key and/or a character and/or a group of characters) requires the user to remember these pre-defined associations during the regular operation of the appliance (when he or she must sometimes work fast). In addition, some of the knowledge pertains to keys on appliances, as mentioned, that refer to four fingers of only one hand.

BRIEF SUMMARY

In order to increase the efficiency of pressing of keys on appliances, as mentioned, a technology was developed that is based on a keyboard key that includes a sensor that recognizes the print of the user's specific finger that was used to press the key or button. The appliance is programmed so that when the user presses the said key using his or her third finger, for instance, a specific, pre-defined function is selected (or a group of characters pre-defined for the finger and key), and when the user presses the same key with his or her little finger or ring finger, other pre-defined functions are selected that correspond to the specific finger that pressed the said key. So far this is all existing knowledge.

The present invention refers to a method and system that enhance the efficiency of the currently existing knowledge in the field.

The present invention provides an interface application enabling multi-functionality of a single key in a computerized device, wherein the identification of the user is known. The interface comprises: at least one input key, said key is associated with at least one sensor for measuring characteristics of a touch interaction of the user finger with said key, a processing module arranged to analyze said characteristics for identifying characteristic of the specific touching finger differentiating said finger from other user fingers and an activation module for determining the functionality of said key based on the identified finger.

According to some embodiments of the present invention the key is a physical button/key.

According to some embodiments of the present invention the key is a virtual button within a touch screen.

According to some embodiments of the present invention the key is the touch screen surface.

According to some embodiments of the present invention the sensor is a pressure sensor and the characteristics are the applied pressure intensity.

According to some embodiments of the present invention the sensor is a touch sensor enabling to measure the touch area and the characteristics include the size of the area.

According to some embodiments of the present invention the sensor is an optical sensor, which enables to capture at least part of distinguishing ridges and valleys of the fingertip wherein the characteristics are the fingerprint of the touching finger.

According to some embodiments of the present invention the sensor is a capacitive sensor, which enables to capture finger print, wherein the characteristics are the fingerprint of the touching finger.

According to some embodiments of the present invention the key includes at least two symbols, wherein each symbol corresponds to a different functionality of the key.

According to some embodiments of the present invention the symbol order on the screen corresponds to order of the touching finger of the user's hand.

According to some embodiments of the present invention is disclosed a method for enabling multi-functionality of a single key in a computerized device, wherein the identification of the user is known. The method comprise the steps of: receiving indication of touching at least one input key by a user and measuring characteristics of a touch interaction of the user finger with said key from at least one sensor, said sensor is associated the with at least one key, analyzing said characteristics for identifying characteristic of the specific touching finger differentiating said finger from other user fingers, said analysis carried out in a computerized device associated with said at least one key, determining the functionality of said at least one key based on the identified finger, activating determined functionality of said key by the computerized device.

BRIEF DESCRIPTION OF THE DRAWINGS

The present invention will be more readily understood from the detailed description of embodiments thereof made in conjunction with the accompanying drawings of which.

DETAILED DESCRIPTION OF THE INVENTION

The present invention provides a unique interface and operation for enabling multiple functionalities to a single key. The term "Key" in the present invention includes physical keys, buttons or virtual touch capabilities when using touch sensitive screens.

According to some embodiment of the present invention, is disclosed a method and system that includes one or more keys, or even an entire keyboard on digital, electronic or other appliances (hereinafter referred to as the "appliances"), whereby each key (which is equipped with a fingerprint recognition sensor) recognizes (using fingerprint recognition technology) the user's specific finger (one of five fingers on one hand, or one of ten when using two hands), and according to the finger that is pressing the key, selects the corresponding function of the key, all according to a simple and full visual correlation between the order of the fingers of the hand and the order of functions associated with the keys.

According to some embodiments of the present invention the appliance on which the invention, subject of the application, is implemented, has one or more keys that are equipped with a fingerprint capture sensor (hereinafter referred to as the "sensor"). Not all keys on the appliance must be equipped with sensors and the invention may be implemented on at least one key on each appliance. For the sake of fluency of the explanation, pushbuttons or keys that are equipped with fingerprint sensors will be referred to as the "keys" (or the "key").

Initialization of the System:

In order for the appliance's sensors to recognize the user's fingerprints and specifically identify the specific finger that pressed the key, the appliance must first be initialized. The initialization is a one-time action (and is not performed every time the appliance is turned on).

Initialization can be performed in several ways. For instance, a special key may be designated for initialization and fingerprint enrollment. The user has to apply the initialization process for the sensors to recognize all his or her fingers. To that end, the user places at one finger, at a time, on the specific key designated for appliance initialization (alternately, initialization may be performed by pressing the key) so that the appliance recognizes each finger according to its unique fingerprint. Initialization can also be performed using a key that is not specifically designated for system initialization. This kind of initialization is very simple and does not require any pre-set associations between specific fingers and specific characters or keys or groups of characters, but rather the enroll of the user's fingerprints and saving thereof in the appliance to enable recognition during its regular operation.

Figure 6:
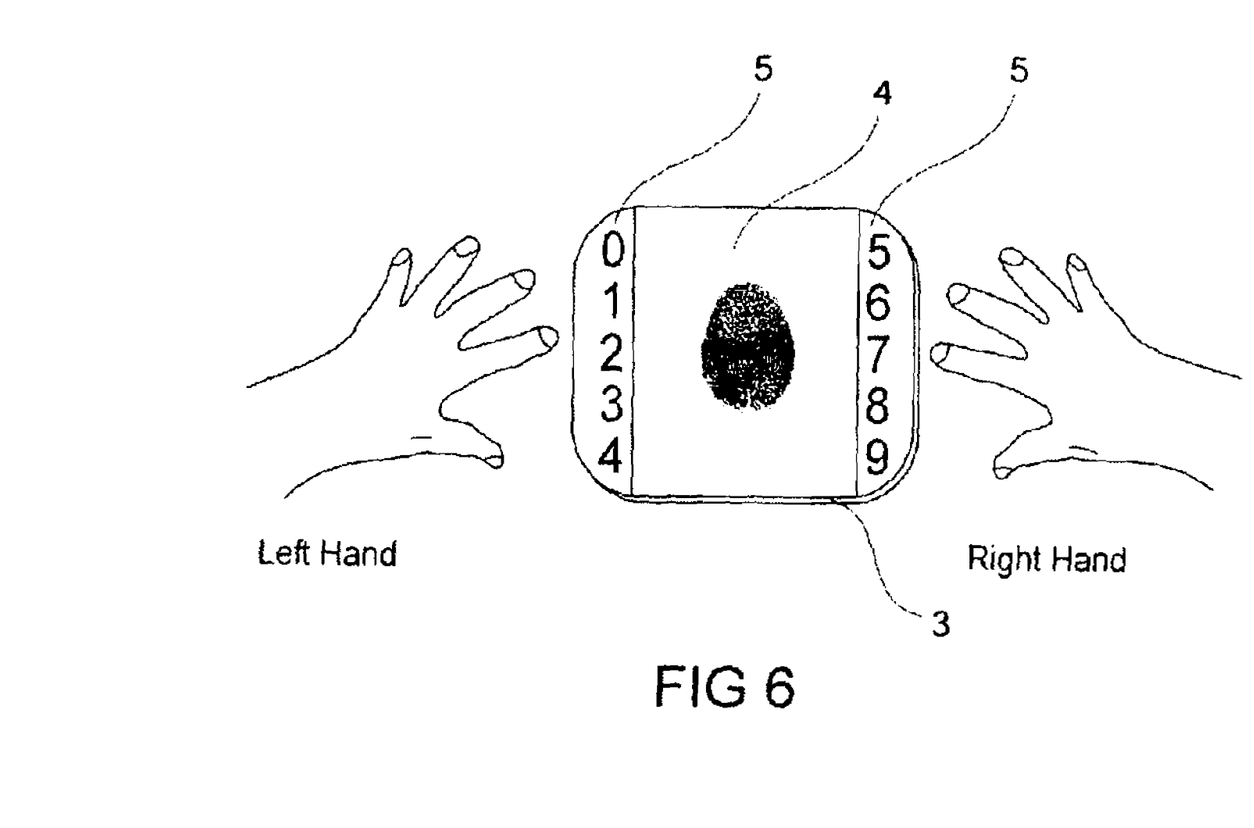
FIG. 6 depicts a key (3) with a sensor (4) and ten symbols (5) arranged in two vertical groups of five on either side of the key, that correlate with the user's ten fingers (of both hands).

Fingerprint Recognition,

During normal operation, pressing once on each key can lead to the selection of one of ten different functions (if the appliance is operated using both hands). The function selected is determined by the finger that pressed the key, according to the order of functions associated with the said key. The present invention can be also implemented on keys that have only five options (five fingers on one hand only), or less. For the convenience of explanation, the drawings and illustrations of the invention, subject of the present application, will refer to an appliance that is designed to recognize five fingers on one hand only, except for FIG. 6 which describes a key designated for use with ten fingers of two hands.

According to some embodiment of the present invention can also be implemented on keys that have sensors over an area that is smaller than the full finger pad area of an average user. In this case, although system initialization includes the full enrollment of the finger pad on a designated sensor, when the user presses a key with a sensor using his or her finger pad, recognition is accomplished based on part of the full area of the finger pad that is saved in the appliance's memory. The invention can be implemented not only on keyboards that represent text writing functions, with which symbols and characters are associated from the common set of symbols and characters, but also on keys/keyboards of control systems, for instance, with which various functions are associated, such as the release of bombs (in weapon systems), activation of sprinklers (in irrigation control systems) and so on. In such cases, the symbol engraved next to the key will be an icon that identifies the desired function (a trigger icon, for instance, in the case of a weapon system or a sprinkler icon in case of an irrigation system).

After initialization, each key on the appliance recognizes the user's fingerprints and can also identify the specific finger that pressed the key. In other words, the sensor identifies which of the user's fingers [thumb, index finger, third finger, ring finger or little finger (of the user's right hand, for instance)] was used to press the key and according to the specific finger, which corresponds to the order of functions associated with the key, the key's appropriate function is selected.

Figure 2:
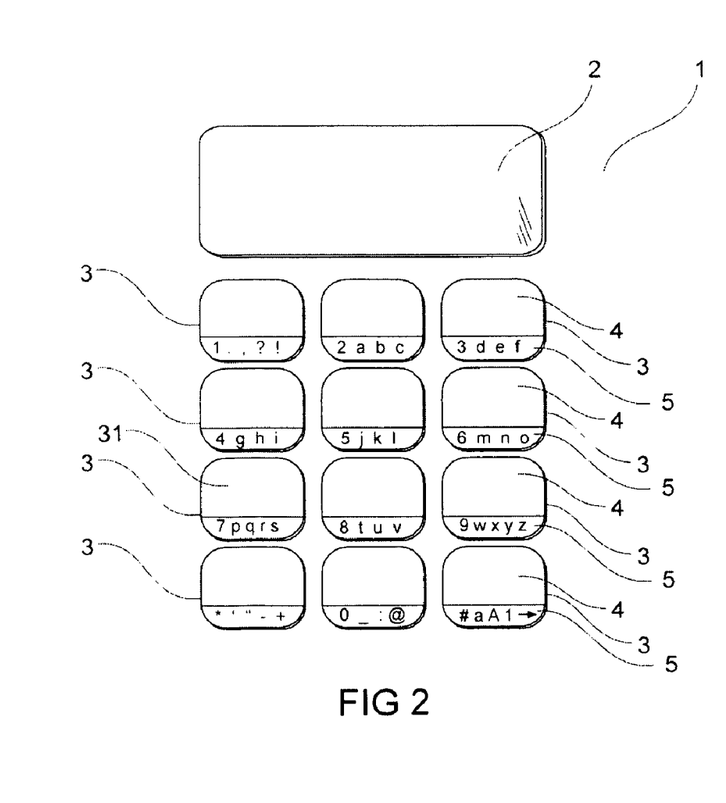
FIG. 2 depicts an appliance (1) with twelve keys (3), each of which has a sensor (4), and five symbols (5) arranged beneath each of the keys in a horizontal row.

FIG. 2 illustrates one of many possibilities for implementing the method and system, subject of the invention. FIG. 2 illustrates the appliance (1) which includes a display panel (2) and twelve keys (3). A sensor (4) is located on the top surface of each of the keys (3). Symbols (5) are engraved/printed on the key (3) or beside it or beneath it or above it in a horizontal line (in FIG. 2 the symbols appear beneath the key). In the case illustrated in FIG. 2, most keys (3) have five symbols (5) beneath them in a horizontal line (although the invention can refer to ten symbols that correspond to ten fingers of two hands, as illustrates for instance in FIG. 6).

A main and principle innovation presented by the method and system, subject of the present invention, is the spatial arrangement of the symbols (5) in relation to each key (3). For example and illustration we will refer to the third key from the top in the left-hand column, which is denoted (31) in FIG. 2.

Figure 3:
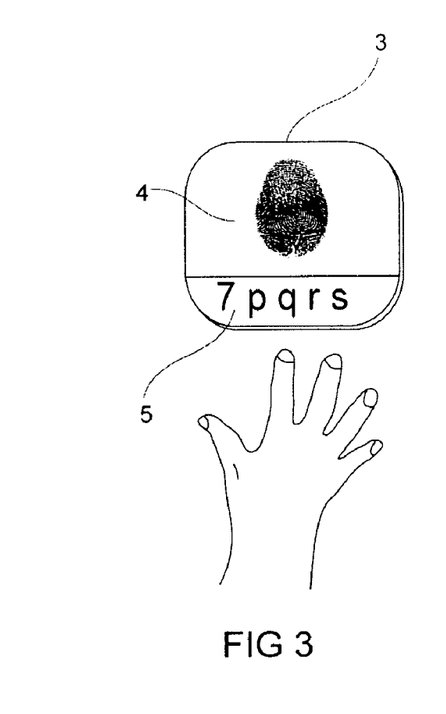
FIG. 3 depicts the key (3) with a sensor (4) and five symbols (5) arranged beneath the key in a horizontal row.

As illustrated in FIG. 3, pressing the key (31) with the thumb (of the right hand) selects the numeral "7"; pressing the key (31) with the forefinger (of the right hand) selects the letter "p"; pressing the key (31) with the third finger (of the right hand) selects the letter "q"; pressing the key (31) with the ring finger (of the right hand) selects the letter "r"; and pressing the key (31) with the little finger (of the right hand) selects the letter "s".

The method and system, subject of the invention, include, as described above, the spatial correspondence whereby using the left-most finger leads to the selection of the left-most symbol in the line of symbols (5) beneath the key (3) (or in the line of symbols above or beside the key), and so on. This innovation enables the user to control the appliance in a fast and efficient manner.

In addition, the key (3) needs to be pressed only once in order to select the desired character/symbol/function from among the five symbols (5) engraved under the key (3). If the key has only four (or less) functions/symbols/characters associated with it, the correlation between the fingers and the functions/characters begins from the left (for example) and proceeds to the right, and ends when all members of the group of functions/characters are associated with fingers.

Figure 4:
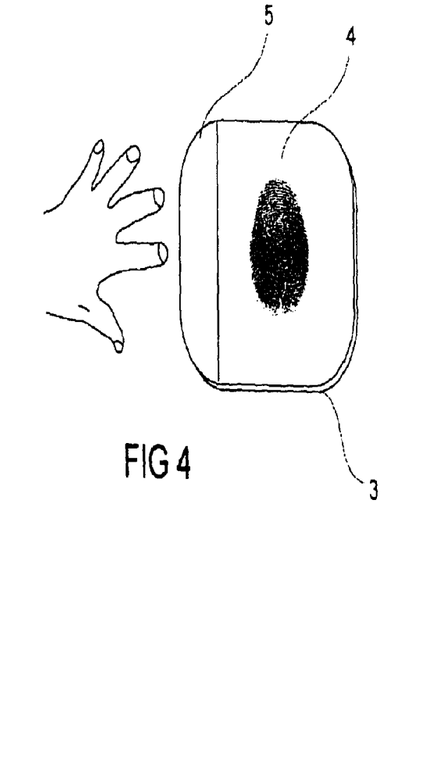
FIG. 4 depicts the key (3) with a sensor (4) and five symbols (5) arranged to the left of the key in a vertical row.

The method and system can also be implemented using East Asian languages, such as Japanese and Chinese. In such cases, the symbols (5) are arranged adjacent to the key (3) in a vertical line, as appears for instance in FIG. 4, and the symbol is selected by matching the order of fingers to the order in which the symbols are specified in a vertical manner (e.g. from top to bottom), as shown in FIG. 4.

Implementation of the invention will enable, for instance, to manufacture a telephone (fixed or mobile) with only one numeral key, assuming the user uses both hands, or with two numeral keys (if only one hand is used to dial).

Figure 5:
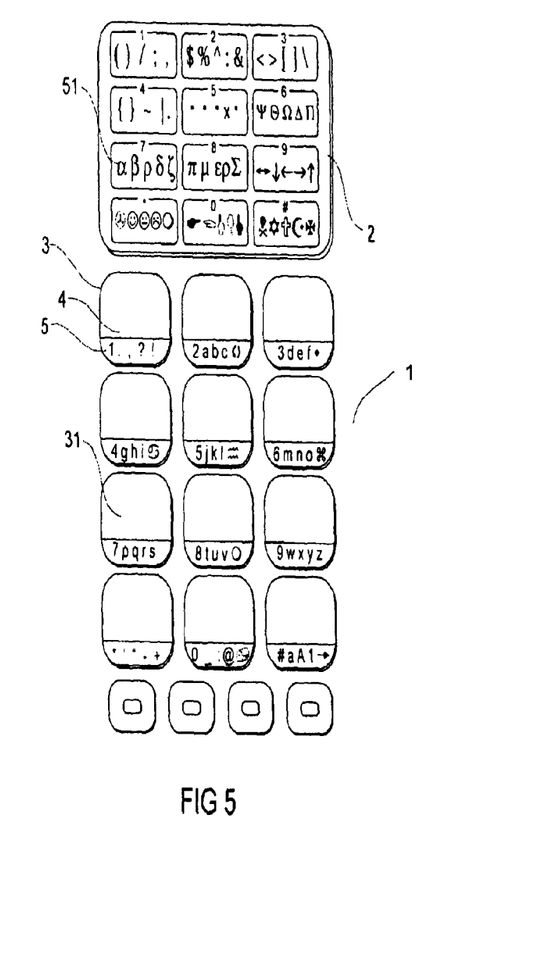
FIG. 5 depicts an appliance (1) with twelve keys (3) each of which has a sensor (4) and twelve series of symbols (5) arranged on the display panel in spatial correlation with the keyboard.

FIG. 5 illustrates additional possibilities for implementing the method and system, subject of the invention. FIG. 5 shows an appliance (1) that includes a display panel (2) and twelve keys (3). A sensor (4) is located on the top surface of each of the keys (3). Symbols (5) are engraved in a horizontal line beneath the key (3) Up to this point, the description is similar to that given above for FIG. 2. In addition, however, the appliance (1) can change operation mode in which additional symbols are displayed on the display panel (2) in such a way that they are arranged in full compatibility with the order of the appliance's keys (3). Thus, for instance, the key (31) operates in operation mode, the group of symbols (51) that appears on the display panel (2) of the appliance (1). For the purpose of example and illustration we refer to the third key from the top in the left-hand row, denoted 31 in FIG. 5.

Pressing the key (31) with the thumb (of the right hand) selects the symbol a; pressing it with the forefinger (of the right hand) selects the symbol β; pressing it with the third finger (of the right hand) selects the symbol, and so on.

By transitioning to another operating mode (or to other character sets), other and additional series of symbols (51) can be displayed on the display panel (2), arranged according to the order and arrangement of the keyboard (3). This method is referred to as "soft keys" and it enables a large and wide variety of options for the operation of the keys, depending on the selected work mode the system is in at a specific moment.

The appliance (1) includes a processor in which the user's fingerprints are saved as enrolled during the initialization of the system. The processor also includes software that identifies the fingerprints of the fingers pressing the sensors (known as a "one-to-few" function). The appliance does not have to be re-initialized every time it is used by the same user since the fingerprints are saved in the processor's memory. The processor can store fingerprint data for a large number of users without re-initialization or identification of the user during regular operation, except for the first time. The invention will prevent people who are not recognized by the system (i.e. whose fingerprints have not been enrolled into the system) from using this fingerprint recognition work mode, an option that adds a security dimension to the system.

Figure 7:
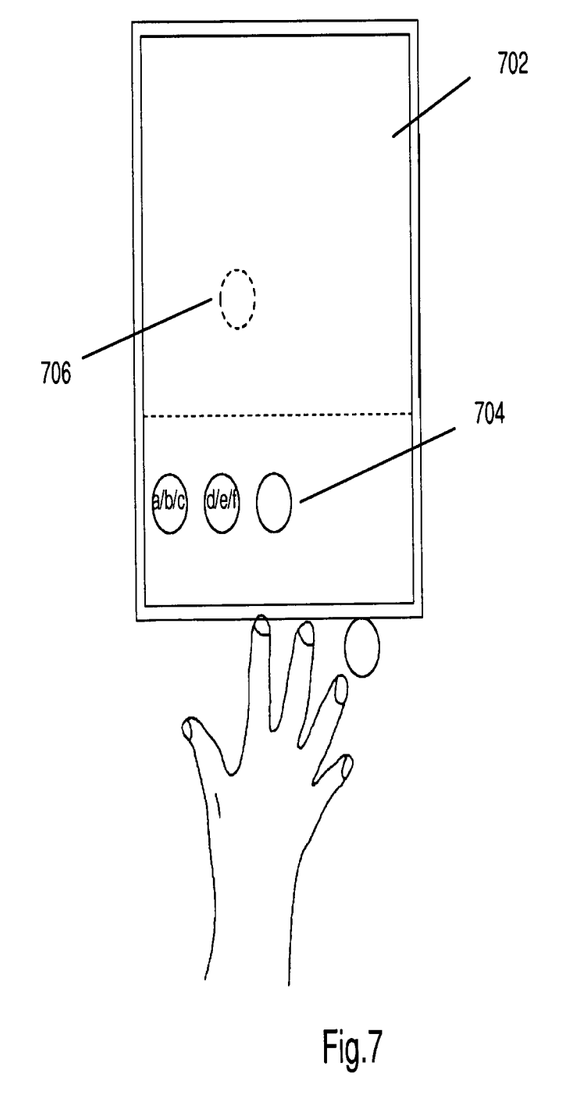
FIG. 7 is illustration of a touch screen interface according to some embodiments of the present invention.

According to some embodiment of the present invention, the keys are virtual keys on a touch screen interface (see illustration in FIG. 7). The touch screen integrates at least one sensor which enables to capture image of the fingertip, sense pressure applied by the touching finger or the size of the touching area. The fingertip image, measured pressure and/or touching area are analyzed for identifying the specific finger of the user. The functionality of the key is determined according to the identified finger.

For example, the interface application may be programmed to activate draw functionality when using the pointing finger or activate erase functionality when using the little finger. Virtual keys can be defined within the touch screen area. Each virtual key may have multiple functions, e.g. different symbols of specific language or different editing functionality e.g. add, insert, delete, etc.

According to some embodiments of the present invention, the touch screen is equipped with an optical, heat a capacitive or any sensor which is enabled to the identification of finger prints. When using an optical sensor the e image fingertip is captured for detecting the fingertips. The detected fingerprints are analyzed by applying recognition algorithms to identify the finger touching the screen ("touching finger"). Based on the identified finger, the corresponding key functionality is determined.

FIG. 7. illustrates, a touch screen having virtual keys (704). On each key may be displayed plurality of symbols denoting the different functionality of the key for different fingers of the user. The symbol order may correspond to the natural order of the fingers, e.g., the most left symbol may correspond to the most left finger of one hand. According to some embodiments a partial area touch screen display (706) functions as a key, for example in a graphic application, portion of the screen is designated for free drawings functionality. According to some embodiments of the present invention, the usage of different fingers may have different drawing functionality such as: draw, erase, mark, color, etc.

Figure 8:
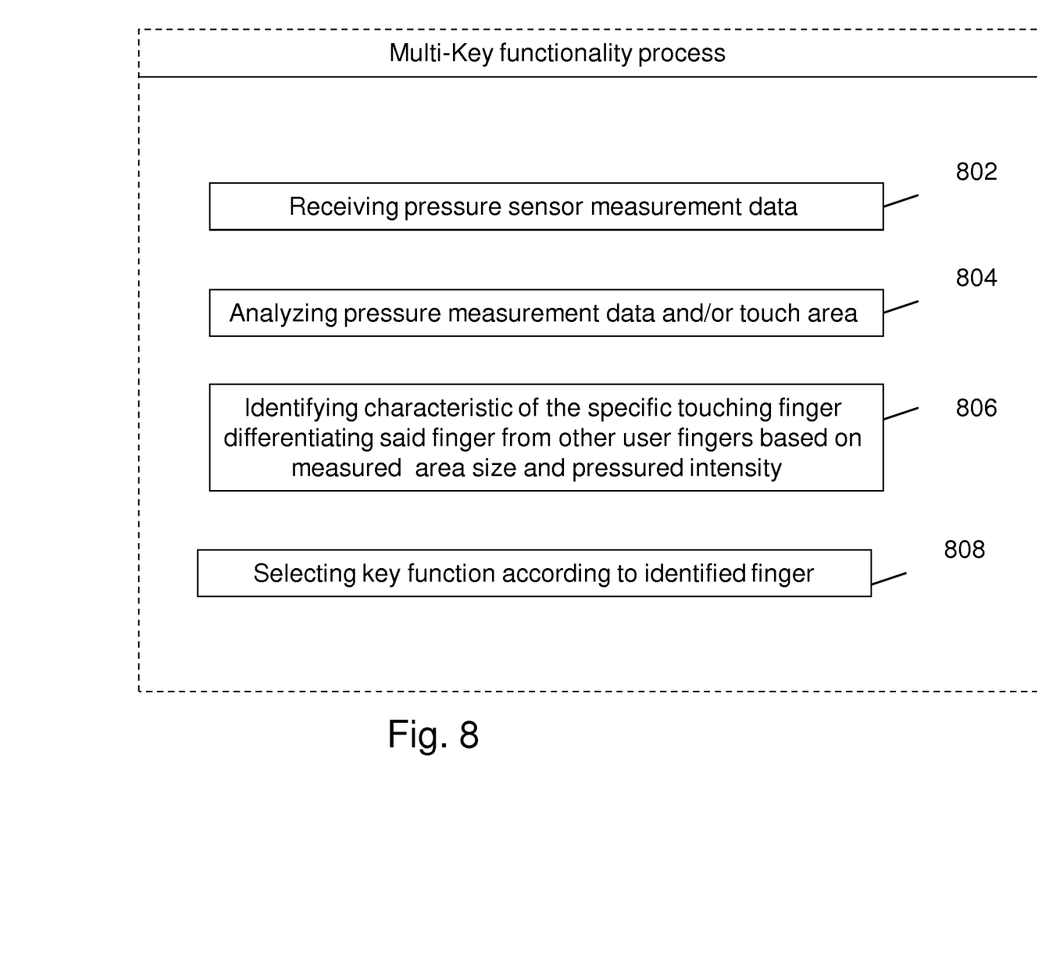
FIG. 8 is a flowchart describing Multi-Key functionality process according to some embodiments of the present invention.

FIG. 8 illustrates the process of enabling multi key functionality by an interface module implemented as part of a computerized device associated with the touch screen. Once the user pressed a key on the touch screen, pressure data measurements are received by the computer device which is associated with the touch screen (step 802). The measured pressure data and the touching area are analyzed (step 804) for identifying between the different fingers of the same user (step 806). For enabling such identification, the interface module has to learn the user's finger characteristics though an initialization process, in which the user identifies each finger when touching the screen.

Once identifying the "touching finger", the interface module selects the corresponding key functionality according to predefined rules (step 808). Optionally, the rules may be changed according user definition in a setting mode of the computerized device.

Figure 9:
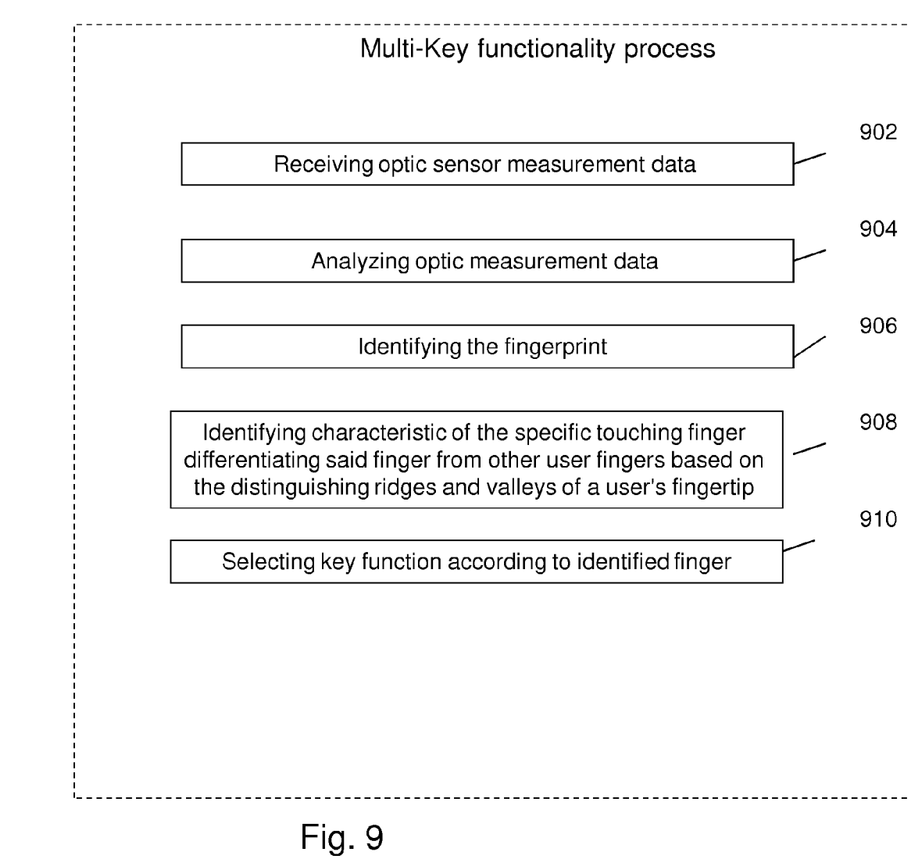
FIG. 9 is a flowchart describing Multi-Key functionality process by identifying finger prints according to some embodiments of the present invention.

FIG. 9 illustrates the process of enabling multi key functionality by an interface module implemented as part of a computerized device which is associated with the touch screen. Once the user pressed a key on the touch screen, fingertip captured image is received by the computer device associated with the touch screen (step 902). The image data is analyzed (step 904) for identifying the distinguishing ridges and valleys of a user's skin ("finger print") (step 906). The identified fingerprint is compared to stored finger prints of the user enabling to differentiate between the fingers of the same user (step 908).

For enabling such identification, the interface module has to learn the user's finger print characteristics through an initialization process, in which the user identifies each finger when touching the screen. The analysis required for differentiating between different fingers of the same user, are not equivalent fingerprint analysis for authentication process. The analysis according to the present invention may require recognizing only part of the distinguishing ridges and valleys of a user's skin to differentiate between the fingers of the same user.

Once identifying the "touching finger", the interface module selects the corresponding key functionality according to predefined rules (step 808). Optionally, the rules may be changed according to user's own definitions, in a setting mode of the computerized device.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein. While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

The invention claimed is:

1. An interface application enabling multi-functionality of a specific area part of an interface in a computerized device, wherein the identity of the user is known, said interface comprising of:
    at least one touch screen area surface, said touch screen area surface is integrated with at least one sensor for capturing at least part of distinguishing ridges and valleys of the touching fingertip touching a specific area;
    wherein once the user pressed the touch screen, his fingertip captured image is received by the computer device associated with the touch screen;
    a processing module arranged to analyze said distinguishing ridges and valleys of the touching fingertip for identifying characteristic of the specific touching finger differentiating said finger from other fingers of the same user and;
    an activation module for determining the functionality of said specified area based on the identified finger and activating the determined functionality, wherein the selection and activation of one function out of multiple different functions is derived from pressing only once on touch screen area surface.

2. The interface of claim 1 wherein the touch screen surface includes at least one virtual button, wherein the virtual key is defined within the touch screen area and each virtual key can be associated with multiple functions, such that the entire touch screen surface is sensitive to fingerprints capturing.

3. The interface of claim 1 wherein the sensor is a pressure sensor enabling to measure the applied pressure intensity for further identifying characteristic of the specific touching finger differentiating said finger from other fingers of the same user.

4. The interface of claim 1 wherein the sensor is a touch sensor enabling to measure the size of the touched area for further identifying characteristic of the specific touching finger differentiating said finger from other fingers of the same user.

5. The interface of claim 1 wherein the sensor is a capacitive sensor, which enables to capture a finger print of the touching finger.

6. The interface of claim 2, wherein the virtual button includes at least two symbols, wherein each symbol corresponds to a different functionality of the virtual button.

7. The interface of claim 1 wherein the symbol order on the screen corresponds to order of the touching fingers of the user's hand.

8. A method for enabling multi-functionality of a specific area part of an interface in a computerized device, wherein the identity of the user is known said method comprising the steps of:
receiving indication of touching touch screen specified area surface by a user and capturing at least part of distinguishing ridges and valleys of the touching fingertip with said touch screen specific area, by a sensor, said sensor is integrated within the touch screen area surface; wherein once the user pressed the touch screen, his fingerprint tip captured image is received by the computer device associated with the touch screen;
analyzing said distinguishing ridges and valleys of the touching fingertip for identifying characteristic of the specific touching finger differentiating said finger from other fingers of the same user, said analysis carried out in said computerized device
determining the functionality of said at least one specified area based on the identified finger wherein the selection of one function out of multiple different functions is derived from pressing only once on touch screen area surface; and
activating determined functionality of said specified area by the computerized device.

9. The method of claim 8 wherein the specific area is a virtual button within a touch screen.

10. The method of claim 8 wherein the sensor is a pressure sensor further identifying—the applied pressure intensity.

11. The method of claim 8 wherein the sensor further measures the touch area and the size.

12. The method of claim 8 wherein the sensor is an optical sensor, which enables to capture finger prints wherein the characteristics are at least part of the distinguishing ridges and valleys of the touching finger.

13. The method of claim 8 wherein the sensor is a capacitive-sensor, which is enabled to capture at least part of distinguishing ridges and valleys of a fingertip wherein the characteristics are the fingerprints of the touching finger.

14. The method of claim 8 wherein the specific area includes at least two symbols, wherein each symbol corresponds to a different functionality of the specific area.

15. The interface of claim 14 wherein the symbol order on the screen corresponds to the order of the touching fingers of the user's hand.

16. The method of claim 8 further comprising a step of applying a one-time initialization action for the sensor to recognize and store the different fingers of the same user, associated with their index numbers, wherein based on this initialization action, the determination of the functionality of the touching finger is carried cut just during the computerized device operation.

* * * * *